(12) United States Patent
Hirohata

(10) Patent No.: US 12,416,914 B2
(45) Date of Patent: Sep. 16, 2025

(54) INFORMATION PROCESSING SYSTEM, INFORMATION PROCESSING METHOD, AND COMPUTER PROGRAM PRODUCT

(71) Applicant: KABUSHIKI KAISHA TOSHIBA, Tokyo (JP)

(72) Inventor: Kenji Hirohata, Koto Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 870 days.

(21) Appl. No.: 17/684,255

(22) Filed: Mar. 1, 2022

(65) Prior Publication Data

US 2022/0382271 A1    Dec. 1, 2022

(30) Foreign Application Priority Data

May 25, 2021    (JP) .................................. 2021-087608

(51) Int. Cl.
*G05B 23/02*    (2006.01)
*G05B 13/04*    (2006.01)
(Continued)

(52) U.S. Cl.
CPC ....... *G05B 23/0275* (2013.01); *G05B 13/041* (2013.01); *G05B 23/0272* (2013.01); *G06N 20/00* (2019.01); *G06Q 50/26* (2013.01)

(58) Field of Classification Search
CPC .............. G05B 23/0275; G05B 13/041; G05B 23/0272; G06N 20/00; G06Q 50/26
(Continued)

(56) References Cited

U.S. PATENT DOCUMENTS

2007/0288208 A1* 12/2007 Grigsby ................. G06Q 10/06
703/2
2016/0019463 A1    1/2016 Bhaskaran
(Continued)

FOREIGN PATENT DOCUMENTS

JP    2016-29560 A    3/2016
JP    6309254 B2    4/2018
(Continued)

OTHER PUBLICATIONS

K. Furuta et al., "Interdependency Analysis of Multiple Lifeline Systems," World Eng. Conf. and Conv. (WECC), OS 1-6-1 (Dec. 2, 2015).
(Continued)

*Primary Examiner* — Justin C Mikowski
(74) *Attorney, Agent, or Firm* — Finnegan, Henderson, Farabow, Garrett & Dunner, LLP

(57) ABSTRACT

An information processing system according to an embodiment includes edge terminals, an information processing apparatus, and one or more service providing apparatuses. The edge terminals each transmit, to the information processing apparatus, monitoring data indicating a state of a target system to be analyzed. The information processing apparatus performs an analysis process by using an analysis model that inputs an input value including the monitoring data transmitted from the edge terminals and outputs an output value of a value function. The analysis process is a process to obtain the output value in response to the input value. The information processing apparatus transmits, to the service providing apparatuses, information indicating an analysis result of the analysis process. The service providing apparatuses each output information obtained by visualizing the analysis result on the basis of information indicating the analysis result.

11 Claims, 13 Drawing Sheets

(51) Int. Cl.
*G06N 20/00* (2019.01)
*G06Q 50/26* (2024.01)

(58) Field of Classification Search
USPC .......................................................... 703/13
See application file for complete search history.

(56) References Cited

U.S. PATENT DOCUMENTS

| | | | | |
|---|---|---|---|---|
| 2016/0371616 | A1* | 12/2016 | Nicholas | G08B 21/18 |
| 2018/0005151 | A1* | 1/2018 | Liao | G05B 23/024 |
| 2020/0389387 | A1* | 12/2020 | Magzimof | H04L 45/16 |
| 2021/0073915 | A1* | 3/2021 | Crabtree | G06Q 30/0611 |
| 2022/0083713 | A1 | 3/2022 | Kano et al. | |
| 2023/0305550 | A1* | 9/2023 | Zhong | G05B 23/0235 |

FOREIGN PATENT DOCUMENTS

| | | |
|---|---|---|
| JP | 2019-211919 A | 12/2019 |
| JP | 2021-47625 A | 3/2021 |
| JP | 2022-49067 A | 3/2022 |

OTHER PUBLICATIONS

S. Greydanus et al., "Hamiltonian Neural Networks," arXiv:1906.01563v3, 16 pages (2019).

G. Sliter, "Risk-Informed Asset Management (RIAM) Development Plan," Elec. Power Res. Inst. (EPRI), https://www.epri.com/research/products/000000000001006268, 94 pages (2002).

K. Furuta et al., "Resilience Analysis of Critical Infrastructure," Recent Adv. in Info. Sci., http://www.wseas.us/e-library/conferences/2016/barcelona/SECEA/SECEA-01.pdf, pp. 21-28 (2016).

Japan Patent Office, Office Action in JP App. No. 2021-087608, 3 pages, and machine translation, 4 pages (Jul. 30, 2024).

\* cited by examiner

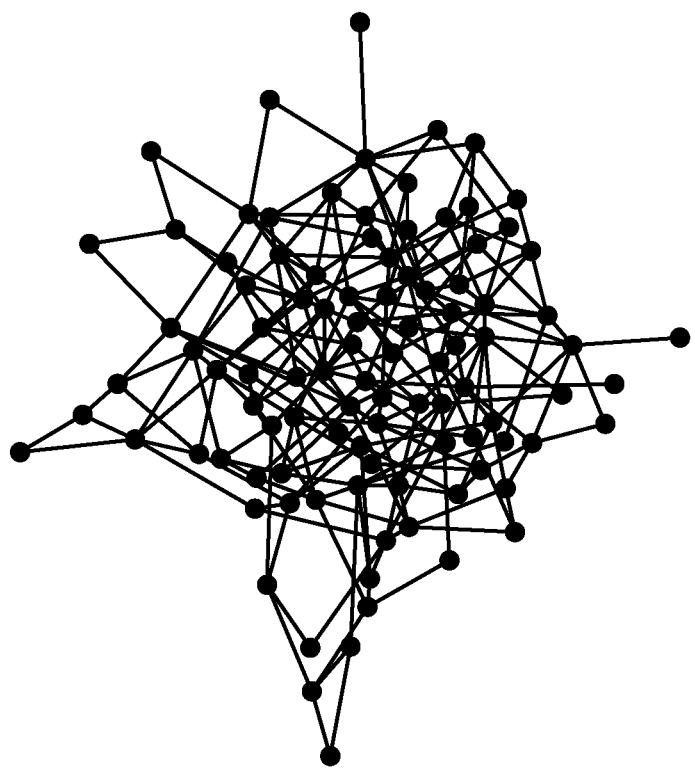
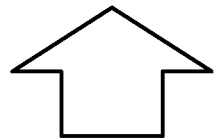
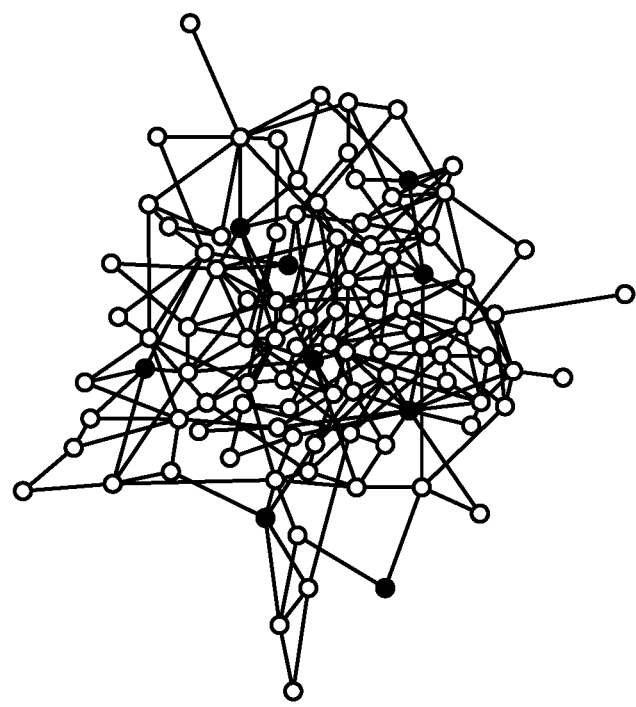
FIG.14

INFORMATION PROCESSING SYSTEM, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2021-087608, filed on May 25, 2021; the entire contents of which are incorporated herein by reference.

FIELD

An embodiment described herein relates generally to an information processing system, an information processing method, and a computer program product.

BACKGROUND

In order to reduce downtime and improve availability of infrastructure systems that are an example of complex systems, there is a need for a method capable of analyzing and visualizing the resilience (disaster prevention, epidemic prevention, supply chain reinforcement, system downtime reduction, and the like) of the complex systems to disturbances on the basis of the concept of Safety-II. Examples of the infrastructure systems include infrastructure facilities, plants, power electronics, storage battery systems, elevation systems, distributed energy, power grids, waterworks networks, transportation networks, and communication networks.

BRIEF DESCRIPTION OF THE DRAWINGS

FIG. 14 is a diagram illustrating an example of a change in the state of a target system due to reconstruction;

DETAILED DESCRIPTION

Figure 1:
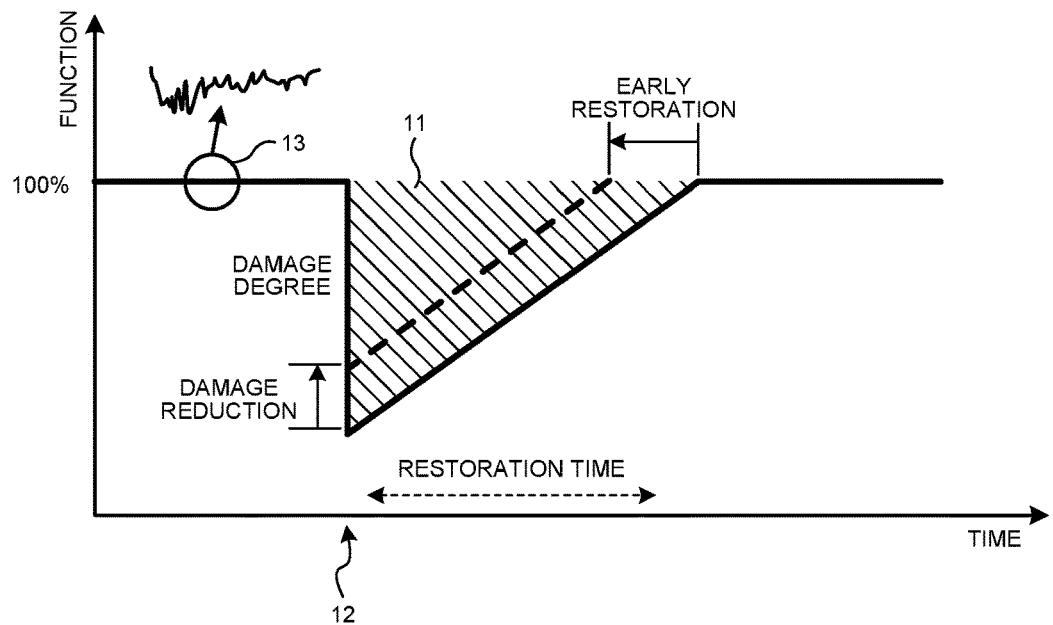
FIG. 1 is a diagram illustrating an example of resilience index and resilience improvement.

An information processing system according to an embodiment includes edge terminals, an information processing apparatus, and one or more service providing apparatuses. The edge terminals each include one or more hardware processors configured to function as a first transmission unit serving to transmit, to the information processing apparatus, monitoring data indicating a state of a target system to be analyzed. The information processing apparatus includes one or more hardware processors configured to function as an analysis unit and a second transmission unit. The analysis unit serves to perform an analysis process by using an analysis model that inputs an input value including the monitoring data transmitted from the edge terminals and outputs an output value of a value function. The analysis process is a process to obtain the output value in response to the input value. The second transmission unit serves to transmit, to the service providing apparatuses, information indicating an analysis result of the analysis unit. The service providing apparatuses each include one or more hardware processors configured to function as an output control unit serving to output information obtained by visualizing the analysis result on the basis of information indicating the analysis result.

A preferable embodiment of an information processing system, an information processing method, and a computer program product according to the present disclosure will now be described in detail with reference to the accompanying drawings.

The following describes, as an example, a case where a target system serving as a complex system to be analyzed is an infrastructure system. The target system is not limited to the infrastructure system.

In the related art, risk-based safety management and crisis management efforts have been made to take safety activities on the basis of the concept of probabilistic risk (harm) such as hazard scenario analysis, risk scenario analysis, and resilience analysis.

Resilience analysis first clarifies the framework of social, individual, organizational, technical, economic, political, cultural, humane, and legal classifications, relationships between the classifications, and the like. Next, a system is clarified, and hazard scenario analysis reveals what the problem is, how the problem occurs, what kind of control mechanisms and responses are available, and the like. Thereafter, by system risk analysis, a risk scenario is clarified, a risk calculation (effect and occurrence probability) and sensitivity analysis are performed, and risk processing and risk management are performed in conjunction with monitoring and review.

Hazards include the following events.
Natural phenomena (earthquakes, strong winds, typhoons, lightning, and the like)
External events (aircraft crash, explosion wave, terrorism, and the like)
Technical accidents (fatigue, wear, corrosion, insufficient knowledge, and the like)
Human errors (operator error, inadequate maintenance and inspection, inadequate management, and the like)

In the present embodiment, it is assumed that examples of a hazard model include the followings.

Load model that target infrastructure receives

Infrastructure strength (damage, failure, and harm criteria) model

Risk calculation model of a harm rate, a failure rate, a damage degree, and the like (effect, occurrence probability, relationship curve between effect and time, or relationship curve between occurrence probability and time)

Availability calculation model (relationship curve between availability and time)

Model that calculates a restoration rate, a repair rate, and a recovery rate of a target infrastructure, or relationship curve between a restoration rate, a repair rate, or a recovery rate and the number of days For example, in analysis such as multi-agent analysis and probabilistic analysis (dynamic probabilistic planning, probabilistic network analysis, Bayesian network, Boltzmann machine, and the like), the relationship of each component with a damage degree, a harm rate, a failure rate, availability, and a repair rate (recovery rate) may be determined for the state, external load, and environment of a component model and interactions between the component model and other component models. A hazard model includes such relationships (for example, correspondence tables and probabilistic models). In the present embodiment, it is assumed that an external load and an environment are included in a hazard model. Examples of a component model include each agent, each node, each mesh, and the like.

Hazards (hazard source and the like) and risks (injury) may be distinguished, but as described above, in the present embodiment, it is assumed that a hazard model includes both hazards and risks. A hazard scenario means a scenario from a hazard source to an injury (harm, failure, damage, and the like). The scenario can be expressed with a tree branch structure in a time axis direction. The risk means the occurrence probability of an injury or the degree of an injury. A risk scenario means a scenario (outline and story) including the occurrence probability of an injury or the degree of the injury in the occurrence of the injury from a hazard source.

However, in a component model of each agent and the like, an action that changes a state of each agent in not included in a hazard model. Examples of an action may include the followings.

Change a state quantity of each agent by control (for example, when an agent is an infrastructure component, a state quantity is forcibly changed to a target value agent by control or when an agent is a vehicle, a person, or a robot, a movement speed or direction is changed, and the like)

Shift the state of an infrastructure facility from a normal state to an abnormal state or a harmed state Progress the level (degree) of an abnormal state or a harmed state of an infrastructure facility (change from Level 1 to Level 2, and the like)

Output a failure rate according to a state or hazard of each node

Change a state quantity according to a state or hazard of each node

Examples of activities such as resilience improvement activities include the followings.

Introduce a terminal for monitoring to reinforce state monitoring

Take activities for repair and recovery in during lead time

Reconstruct (including recombine) a network structure of each component model

Newly introduce distributed infrastructure components (including arranging them as spares)

Make components robust

Activities can be interpreted as activities scenarios indicating scenarios of policies, plans and measures (activities) for hazards. Activities can affect the configuration, state, hazard, environment, operation, and the like of a target system. That is, activities are reflected in configuration data, actions, and hazard models in resilience analysis and visualization.

Each of the activities (scenarios of policies, plans and measures) can be divided into more detailed scenarios of policies, plans and measures. For example, the following scenarios of policies, plans and measures can be taken to reinforce monitoring.

Set a new sensor

Using an existing apparatus as an avatar terminal for monitoring

Perform monitoring by changing (moving) an arrangement position of a sensor or an avatar terminal Add or change the type of monitoring data to be monitored Change an operation condition (resolution and the like) of a sensor or an avatar terminal A sensor and an avatar terminal are examples of acquiring devices that acquire monitoring data. The acquiring device may be any apparatus, but is, for example, a camera (imaging apparatus), an image sensor, an acceleration sensor, an acoustic emission (AE) sensor, and the like.

As specific methods of reconstructing a network structure, there are autonomous distribution type, centralized control type, and hybrid type scenarios of policies, plans and measures. As network topologies, a star type, a ring type, a bus type, a tree type, a mesh type, and a hybrid type have been known. The hybrid-type topology includes a tree type, a random type, and a radial type.

Changes in action rules (changes in action setting specifications, such as changing a control target, a configuration of the control target, a range of the control target, a control method, and the like) are included in scenarios of policies, plans and measures (activities) for improving resilience. Action rules may be learned (updated) by sequentially using a value function (or a reward function and a loss function) and the like as an index as monitoring data, resilience analysis results (also including sensitivity analysis results and the like), and actual resilience evaluation data are expanded.

In multi-agent analysis and analysis based on mathematical programming, a model related to an action (decision making based on mathematical programming, and the like), a state, and a value is hereinafter referred to as a multi-agent model.

Monitoring includes monitoring of the following data.

State of component model

External load and environment

Interaction between component models

A value function is set for hazard models, actions, states, and the like depending on the purpose of analysis. The value function may be set in consideration of other classifications such as economic efficiency.

In the above, terms such as damage, failure, and restoration have been used by using resilience for disaster prevention as an example. However, applicable resilience is not limited to resilience for disaster prevention. For example, in resilience for the supply chain, an inventory shortage rate and a supply shortage rate for demand may correspond to hazards. In resilience for epidemic prevention, an infection rate and a cure rate may correspond to hazards.

In this way, a value function is a model that quantitatively measures values such as availability, reliability, safety, economic efficiency, and comfort. Multifaceted analysis may be configured to be performed by setting a plurality of value functions.

System risk analysis uses techniques such as the followings.

Preliminary hazard analysis (PHA)
Failure modes and effect analysis (FMEA)
Failure mode effect and criticality analysis (FMECA)
Hazard and operability studies (HAZOP)
Incident data bank Effects of system failure include the following items.
Hazard to human or public safety
Damage to surrounding environment
Physical damage to systems
System operation interruption (for example, blackout, distribution/traffic suspension, production line suspension, communication interruption, suspension of water supply, elevator suspension, and the like)

PHA extracts items such as the followings.
Hazardous element
Event that cause Hazard
Hazardous state
Event that leads to potential accident
Potential accident
Effects
Prevention means FMEA clarifies items such as the followings.
Apparatuses (or subtasks) or processes (means) required for continuing (sustaining) system operation, and functions and operating states thereof
Failure modes of these apparatuses or processes, all routes that may prevent the apparatuses from achieving their functions
Causes of failure modes, internal causes such as apparatus failures, and external causes such as suspension of power supply and operator errors
Detection and correction of failure modes
Operator response
Inspection and maintenance
Effects of failure events on performance of other constituent apparatuses and systems FMECA is a logical extension of FMEA, and is classified according to the importance of effects that may occur by failure events. In order to determine the criticality of each failure mode, both failure frequency (probability) and failure effects (effect: minor, fatal, critical, catastrophic, and the like) are evaluated. At this case, each device and each subsystem are taken into consideration.

HAZOP is used for identifying hazards or operational problems of a target system (plant and the like). Target items, deviations, potential causes, effect, and required responses (responses required to reduce the importance of deviations and effect, and the like) are clarified.

Incident data bank stores data such as accident data, near misses, reliability data, and system historical performance and statistical data, and uses the stored data to identify potential significant hazards, hazard causes, and hazard effect. Examples of the incident data bank include an architecture and engineering performance information center (AEPIC) that collects data on the performance of constructed structures (buildings and the like), and the like.

The model representation of a system includes an event tree (ET) and a fault tree (FT).

ET represents a logical order of event occurrence in a system. For example, each event is described such that all subsequent events that may occur from the occurrence of an initiating event are in order over time. Effects of reaching a given level or higher of system failure or the end of failure is clarified and represented. A large number of results are derived from one initiating event. Resultant events include various levels of damage, human damage, and economic loss. ET modeling uses risk source identification methods such as FT, FMEA, FMECA, and HAZOP.

A damage degree (harm rate and failure rate) (Damage) can be represented as follows by using hazard (Hazard), exposure (Exposure) indicating a target to be lost, and vulnerability (Vulnerability) indicating susceptibility to harm as parameters.

Damage=Function (Hazard, Exposure, Vulnerability)

A resilience index (Resilience) can be represented as follows by using the damage degree (Damage), activities (Activities), and restoration time (Time) as parameters.

Resilience=Function (Damage, Activities, Time)

FIG. 1 is a diagram illustrating an example of a resilience index and resilience improvement. In FIG. 1, the resilience index corresponds to an area of a region 11. A restoration time represents the time from the time 12 indicating the occurrence of a disaster to the restoration of the disaster. The resilience index may further include resilience potential (flexibility and robustness) to disturbances. A region 13 indicates an example of a region where functions are maintained without being reduced due to high resilience potential. As illustrated in FIG. 1, when damage can be reduced, early restoration from a disaster is accelerated and an area of the region 11, which is a resilience index, can be made smaller.

The following describes problems when a complex system such as an infrastructure system is analyzed. The infrastructure system has complex interactions between parts, units (components or modules), and subsystems. The causes and effect of physical phenomena in the system may not often be sufficiently understood and unpredictable events may occur. Uncertainty, ambiguity, and indeterminacy are inherent in the modeling of the complex system.

Interactions are likely to occur when such states as the following occur.
Common mode or common cause association
Interrelated subsystems
Feedback loop
Indirect information
Multiple related controls
Limited understanding
Limited possibility of isolating failed apparatus
Limited replacement of supply materials A combination of composite hazards, design defects, apparatus failures, and operator errors may lead to complex interactions. In a complex system, exogenous factors and endogenous factors may cause non-linear phenomena (emergent phenomena and resonance phenomena) such as Bullwhip effect, self-similarity, phase transition phenomena, meta-stability, and unexpected operations, which may lead to a critical phase (crisis).

It has been recognized that the related technology is not able to cope with safety issues related to highly complex social systems. In complex systems, such phenomena as the following may lead to accidents.
Emergent phenomenon that the whole order is produced from local interactions between elements Chaos or pattern formation (dissipative structure and the like) in which complex and disorderly behavior appears from a non-linear but simple and deterministic mechanism Fat tail where low-frequency events occur more frequently than expected from the law of large numbers, which is the basic theorem of probability statistics In this way, there is the problem that non-linear interactions between elements constituting a complex system (system elements) and between external loads cause a system to be unstable and a new whole order is formed, which may lead to accidents.

States of the system and system elements are not distinguishable from normal and abnormal, and are constantly varying. This variation is essential for the system and is not stoppable or removable. In a complex technological social system, small variations in the functions of many system elements may cause emergent phenomena, and large functional variations may be induced in the entire system. When such phenomena occur, it is conceivable that multiple safety protection barriers are destroyed, resulting in accidents that exceed expectations.

Figure 2:
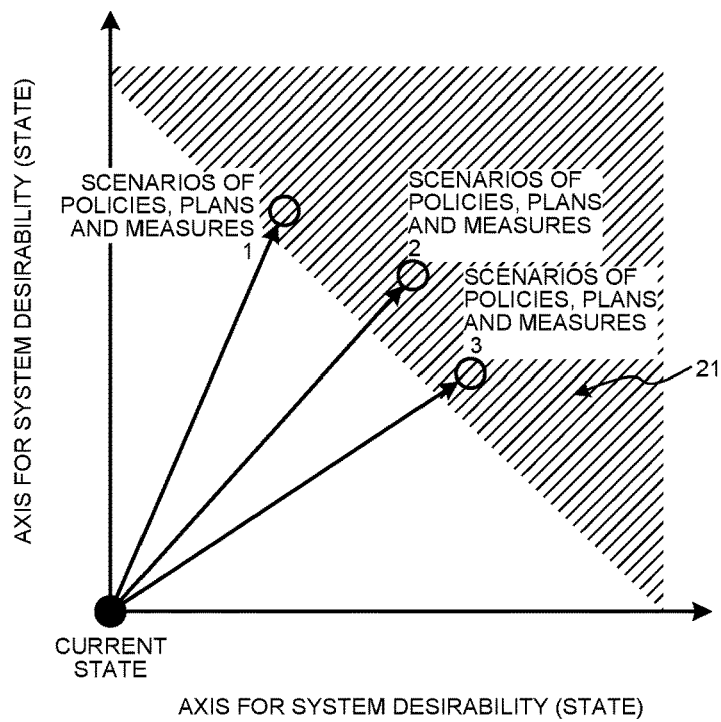
FIG. 2 is a diagram for explaining an example of a multi-stable state.
Figure 3:
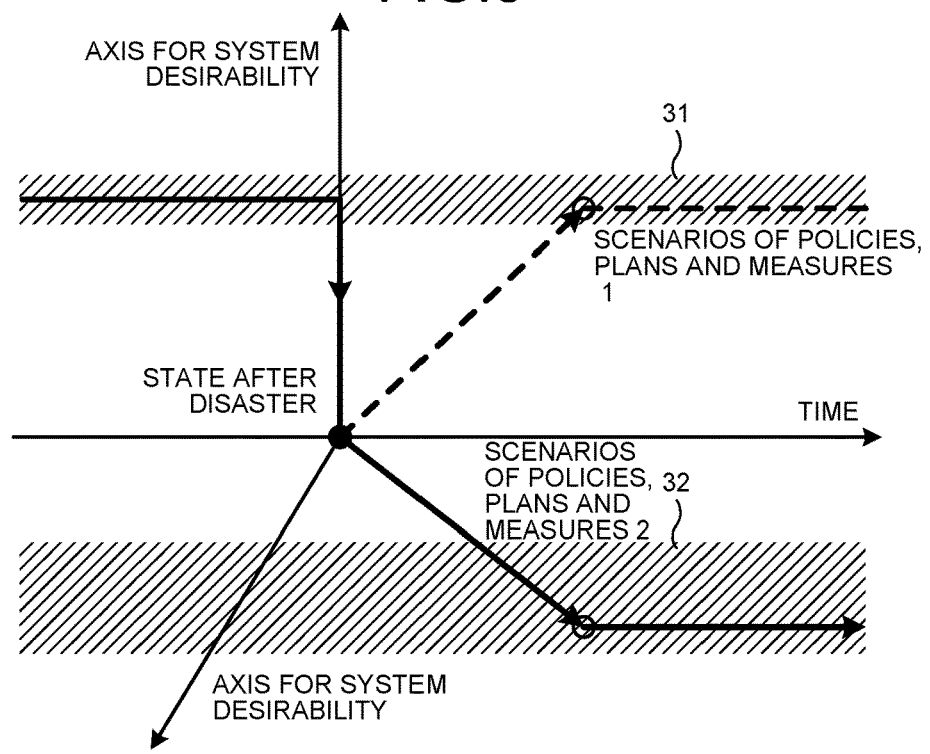
FIG. 3 is a diagram for explaining an example of a multi-stable state.

In order to improve the resilience of such complex infrastructure systems, there may be multiple scenarios of policies, plans and measures that are in a desirable state (stable state) (multi-stable state). FIG. 2 and FIG. 3 are diagrams for explaining an example of a multi-stable state. Regions 21, 31, and 32 are regions representing a desirable state.

In emergent phenomena of complex infrastructure systems, there is a case where a competing mode is present in an initial stage (omen stage), a mainstream mode (critical instability hypothesis) gradually disappears during a transition process, and a stable mode appears in a steady state, and also there is a case where crisis occurs due to an increase in instability. Therefore, before the crisis, it is important to provide a method for finding a sign, selecting data to be monitored in order to ascertain the sign, and reconstructing the infrastructure system so as to prevent an increase in instability.

The concept of new resilience such as Safety-II has been advocated to cope with the above situations. The concept of the new resilience is a concept of extending risk-based safety and crisis management that takes safety activities on the basis of the concept of probabilistic risk. In the concept of the new resilience, it is important to carry out "prediction", "monitoring", "response", and "learning" under an appropriate process approach and a simulation-based system approach based on hypothesis verification, prioritization, and optimization of resilience improvement scenarios of policies, plans and measures. However, specific resilience analysis methodologies or frameworks based on the process approach and the system approach have not yet been established.

Resilience analysis that takes interdependence of important infrastructures into consideration is also performed. However, in such resilience analysis, monitoring, physical simulations, surrogate models, and optimization are not linked. Furthermore, indeterminacy of hazard modes is also large, and hazard scenarios, risk scenarios, and activities scenarios are also carried out within a limited range. Therefore, it is insufficient to perform hypothesis verification, prioritization, and visualization of effects on resilience improvement scenarios of policies, plans and measures in a distributed complex infrastructure system.

The present embodiment captures the resilience of an infrastructure with the concept of social ecology and evolutionary resilience, and implements resilience improvement scenarios of policies, plans and measures such as decentralization, modularization, and reconstruction of an infrastructure system from the viewpoint of complex systems and hierarchical networks of the infrastructure. With this, it is possible to increase resilience potential (flexibility and robustness) against disturbances. The present embodiment provides a framework (methodology) for hypothesis verification, prioritization, and visualization of effects of scenarios of policies, plans and measures for improving resilience.

The framework and components of resilience analysis according to the information processing system of the present embodiment are described below. Hereinafter, it is assumed that the resilience analysis includes not only a function of analyzing resilience but also a function of visualizing an analysis result on a display apparatus and the like.

In order to efficiently implement resilience analysis of a complex system, it is necessary to take at least one of the following points A1 to A3 into consideration.

A1: The number of hazard-related scenarios (hazard scenarios and risk scenarios) and activities scenarios is enormous and it takes a lot of time to prioritize and optimize activities.

A2: It is often not clear what kind of items should be monitored to detect abnormal signs of complex systems and improve resilience.

A3: There is a great deal of indeterminacy in the modeling of hazards that infrastructure systems receive.

The information processing system according to the present embodiment provides a framework for more efficiently implementing resilience analysis of complex systems. The framework enables analysis and management functions to be provided as services. Customers can use services capable of implementing resilience analysis without changing a current customer system.

In the framework, it is desirable that analysis and management services such as industrial Internet of things (IIoT) are defined (published) as application programming interface (API) and API specifications are industry standards such as OpenAPI and web services description language (WSDL). Furthermore, the framework of the present embodiment may have, for example, a function of synchronizing time information (trigger) and position information. The position information can be synchronized using, for example, a global positioning system (GPS), a geographic information system (GIS), and a global navigation satellite system (GNSS).

Figure 4:
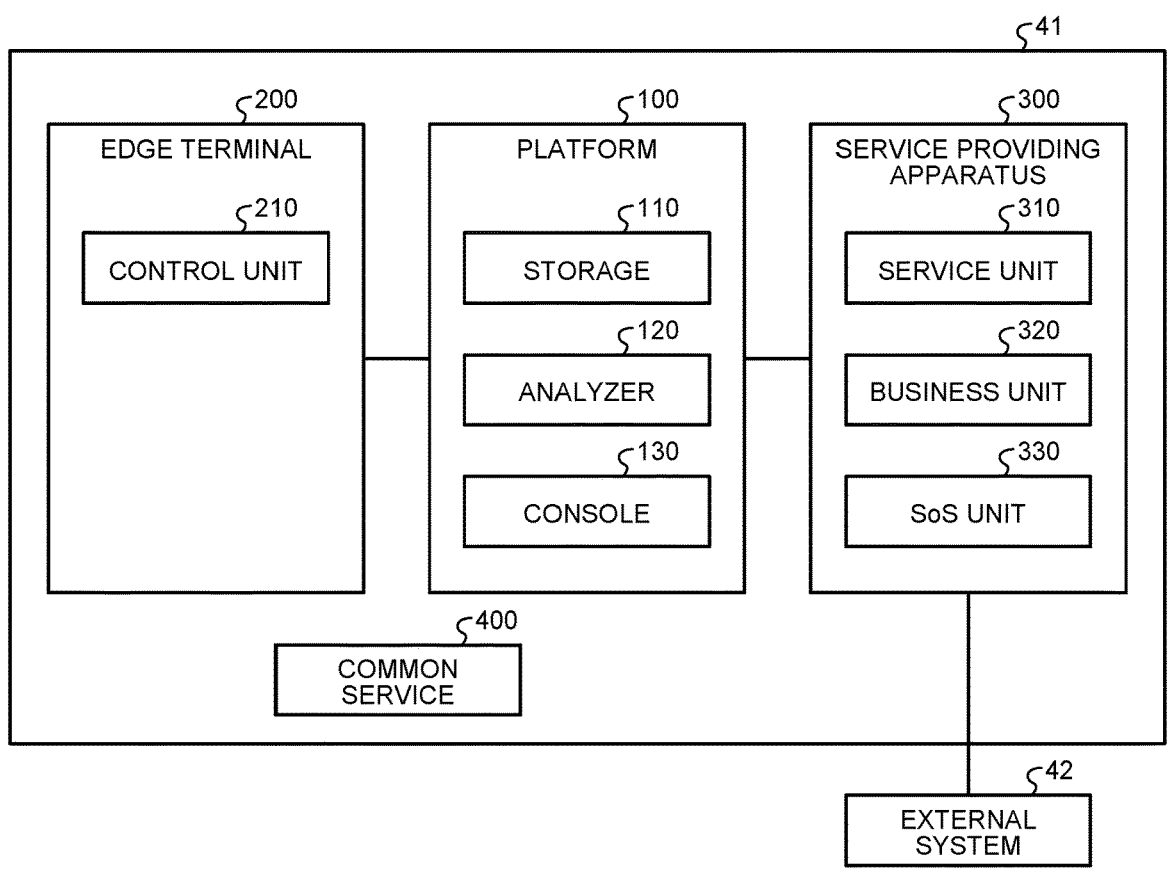
FIG. 4 is a block diagram of an information processing system of the present embodiment.

FIG. 4 is a block diagram illustrating an example of the configuration of an information processing system 41 of the present embodiment. As illustrated in FIG. 4, the information processing system 41 includes a platform 100 as an information processing apparatus, an edge terminal 200, a service providing apparatus 300, and a common service 400.

The edge terminal 200 may be implemented by any of the following methods.

Actual sensing and monitoring terminal

Acquiring unit on a computer, which acquires data such as seismic observation data, meteorological observation data, traffic information, and satellite image data over a network Virtual edge terminal (data generation unit or data setting unit) that virtually generates sensing and monitoring data on a computer, or sets assumption data by referring to a database. A function of the edge terminal 200 to transmit data (such as a first transmission unit to be described below) may be virtual data transmission on the computer. The edge terminal 200 and the platform 100 are connected by, for example, an interface functioning as an IoT bus. The platform 100 and an enterprise service are connected over, for example, a service bus such as API. The IoT bus and the service bus may be implemented by any method. For example, the IoT bus and the service bus can be implemented by a network (may be any of wired and wireless networks) such as the Internet.

The information processing system 41 may be connected to an external system 42 over, for example, a network such as the Internet. The external system 42 is a system that operates in cooperation with the service providing apparatus 300.

While FIG. 4 illustrates only one edge terminal 200, one platform 100, one service providing apparatus 300, and one external system 42, they may be provided in plural, respectively. It can be interpreted that the entire information processing system 41 corresponds to a cyber physical system (CPS) system. Furthermore, it can be interpreted that the service providing apparatus 300 and the external system 42 correspond to the CPS system, respectively.

The edge terminal 200 includes a control unit 210 that controls various processes of the edge terminal 200. For example, the control unit 210 controls the following processes.

Collection of data such as monitoring data
Communication with an external apparatus such as the platform 100 (first transmission unit)
Analysis of data
Conversion of data
Operation control based on control information transmitted from the platform 100 and the like The platform 100 includes a storage 110, an analyzer 120, and a console 130. The storage 110 stores data collected by the edge terminal 200 and the like (hereinafter, referred to as monitoring data), and master data. The master data is, for example, data related to specifications of the edge terminal 200, specifications of a usage environment, a design drawing, maintenance history, and the like.

For resilience analysis, the master data includes, for example, configuration data indicating the configuration of a target system, data indicating activities that affect the target system, data indicating actions that affect the target system, and data indicating a hazard model that models hazards (faults) occurring in the target system.

The storage 110 can be formed of any storage media that are commonly used such as a flash memory, a memory card, a random access memory (RAM), a hard disk drive (HDD), and an optical disk. The storage 110 may be implemented by, for example, storages that store monitoring data and master data, respectively. The storages may be physically different storage media or may be implemented as different storage regions of physically the same storage medium.

The analyzer 120 analyzes the monitoring data stored in the storage 110. For example, the analyzer 120 performs resilience analysis using the monitoring data. Details of the resilience analysis will be described below. The function of performing the resilience analysis does not need to be provided in the analyzer 120, and is provided at least in the platform 100.

The console 130 generates control information for controlling the edge terminal 200 on the basis of the analysis result of the analyzer 120, and the like. The console 130 transmits the generated control information to the edge terminal 200, thereby operating the edge terminal 200. The control information may be any information as long as it is information for changing the state of the edge terminal 200. For example, the control information is information for causing the edge terminal 200 (the control unit 210) to perform communication, and analysis, state change, sensing, operation instruction, and the like on the edge terminal 200.

Each of the units (the analyzer 120 and the console 130) is implemented by, for example, one or more hardware processors. For example, each of the units may be implemented by causing the processor, such as a central processing unit (CPU), to execute a computer program, that is, software. Each of the units may be implemented by a processor such as a dedicated integrated circuit (IC), that is, hardware. The units may be implemented with a combination of software and hardware. When two or more processors are used, each processor may implement one of the units, or may implement two or more of the units.

The control unit 210 of the edge terminal 200 serves to transmit monitoring data to the platform 100, and receive control information from the platform 100. The control unit 210 performs control in the edge terminal 200 on the basis of the control information. On the basis of a changed state of the edge terminal 200, the control unit 210 further transmits monitoring data to the platform 100, and receives control information from the platform 100. By repeating such a loop (CPS loop), a large number of edge terminals 200 are controlled based on the monitoring data accumulated in the platform 100 and an analysis result for the monitoring data.

The service providing apparatus 300 is an apparatus that provides a service using at least one of the monitoring data and the analysis result. The service providing apparatus 300 includes a service unit 310, a business unit 320, and a system of systems (SoS) unit 330.

The service unit 310 is used for a person (administrator) who confirms the monitoring data accumulated in the platform 100 and the analysis result, a person who inspects the state of the CPS loop on the basis of his/her wisdom, a person who manually changes the state of the CPS loop, and the like.

An administrator performs, for example, CPS loop inspection, audit, detection of abnormality occurrence, detection of AI errors (CPS loop abnormality) caused by attacks, and the like on the basis of the knowledge as an expert, and confirms whether the information processing system 41 is properly operating from his/her eyes. When the CPS loop abnormality is perceived, the administrator may troubleshoot the CPS loop by transmitting control information via the service unit 310, or by other methods.

The business unit 320 provides services using the monitoring data and the analysis result. For example, the business unit 320 provides services such as customer relationship management (CRM), enterprise resource planning (ERP), product lifecycle management (PLM), and enterprise asset management (EAM).

The SoS unit 330 includes multiple internal systems and performs cooperation and the like of those internal systems. For example, the SoS unit 330 integrally controls (orchestrates) the CPS loop by using information generated in the service providing apparatus 300, the monitoring data accumulated in the platform 100, and the analysis result.

In a case that multiple service providing apparatuses 300 are provided, the information processing system 41 includes multiple SoS units 330. One service providing apparatus 300 may include the multiple SoS units 330. Each of the SoS units 330 includes multiple internal systems. The SoS units 330 may cooperate with one another via the platform 100, or may cooperate with one another without the platform 100.

Each of the internal systems may be any system as long as it is independently managed and operated. For example, the internal system may be a CPS system or a system that provides services by a cloud server or a multi-access edge computing (MEC) server. The internal system may be a system that provides a service corresponding to the business unit 320.

The internal system receives information and requests from the edge terminal 200 and the like, and returns information corresponding to the received information and requests. The internal system may accumulate information received from the edge terminal 200 and the like, and construct information (digital twin) that reproduces the real world on a cyber world.

The SoS unit 330 exchanges information with the distributed internal systems and provides a function that is not implementable by a single system. For example, in principle, each of the internal systems performs control for optimization (partial optimization) in a controllable region therein. On the other hand, the SoS unit 330 integrally controls the internal systems, and performs control for optimization (overall optimization) in all the internal systems integrally controlled. The SoS unit 330 is not limited thereto and for example, may be a system that provides a function different from that of each of the internal systems.

Each of the internal systems may be a system related to a single industrial field (service). The SoS unit 330, for example, integrally controls internal systems belonging to different industrial fields.

Regarding resilience analysis, the SoS unit 330 is used for confirming a result of resilience analysis targeting a complex system by the internal systems integrally controlled, specifying analysis conditions (configuration data, actions, hazard models, and the like) for the resilience analysis, implementing scenarios of policies, plans and measures based on the result of the resilience analysis, and the like.

Each of the units (the service unit 310, the business unit 320, and the SoS unit 330) is implemented by, for example, one or more hardware processors. For example, each of the units may be implemented by causing the processor such as a CPU to execute a computer program, that is, software. Each of the units may be implemented by a processor such as a dedicated IC, that is, hardware. The units may be implemented with a combination of software and hardware. When two or more processors are used, each processor may implement one of the units, or may implement two or more of the units.

The common service 400 is an apparatus that provides services that are commonly available to the respective units (the edge terminal 200, the platform 100, and the service providing apparatus 300) in the information processing system 41. The common service 400 provides, for example, the following functions.

Security function
Logging function
Charging function

Figure 5:
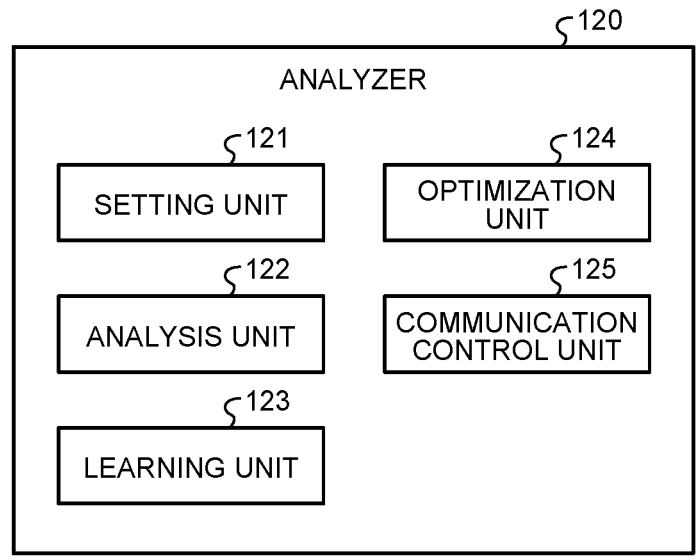
FIG. 5 is a functional block diagram of an analyzer.

The following describes details of the functions of the analyzer 120 of the platform 100. FIG. 5 is a block diagram illustrating an example of the functional configuration of the analyzer 120. As illustrated in FIG. 5, the analyzer 120 includes a setting unit 121, an analysis unit 122, a learning unit 123, an optimization unit 124, and a communication control unit 125 (second transmission unit).

The setting unit 121 serves to make various settings for resilience analysis. For example, the setting unit 121 sets analysis conditions including at least part of configuration data, actions, hazard models, and the like of a target system. The setting unit 121 may make these settings according to a designation from the service providing apparatus 300 (the SoS unit 330). When the target system is reconstructed, the setting unit 121 sets configuration data of the reconstructed target system.

The analysis unit 122 serves to perform the resilience analysis in accordance with the setting of the setting unit 121. For example, the analysis unit 122 performs, by using an analysis model for the resilience analysis, an analysis process of obtaining an output value in response to an input value including monitoring data transmitted from the edge terminal 200. The analysis model is, for example, a model that receives the input value including the monitoring data and outputs an output value of a value function, after analysis conditions such as configuration data, actions, and hazard models are set. Details of the analysis model and the analysis process using the analysis model will be described below.

The learning unit 123 serves to perform a learning process of various models used in the information processing system 41. For example, the learning unit 123 learns (identifies and updates) a hazard model or a multi-agent model by comparing and collating monitoring data with simulation data. The simulation data is data that is output during resilience analysis. For example, the simulation data is data such as load, state quantity, and degree of abnormality obtained from a hazard simulation based on a physical model, and is state quantity data for each mesh or each node obtained from a multi-agent simulation or mathematical programming. For example, the learning unit 123 learns a hazard model (load model, risk calculation model, and the like) or a multi-agent model (state-action relational model) to reduce an error of a predicted value based on monitoring data at a given time point and the simulation data.

In a case that the analysis model is constructed by machine learning such as a neural network model, the learning unit 123 may learn the analysis model by using learning data preliminarily prepared.

The optimization unit 124 serves to perform an optimization process based on the resilience analysis. For example, the optimization unit 124 causes the analysis unit 122 to perform resilience analyses each of whose combination of analysis conditions (configuration data, actions, and hazard models) is different from one another. The optimization unit 124 then executes a combinational optimization problem for obtaining analysis conditions for which an output value is optimal.

The communication control unit 125 serves to control communication with an external apparatus such as the service providing apparatus 300. For example, the communication control unit 125 (second transmission unit) transmits information indicating the analysis result of the resilience analysis to the external apparatus such as the service providing apparatus 300.

Figure 6:
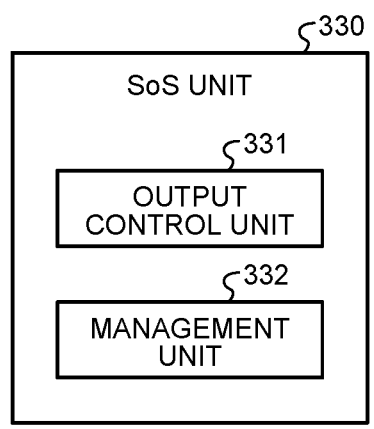
FIG. 6 is a functional block diagram of a system of systems (SoS) unit.

The following describes details of the functions of the SoS remit 330 of the service providing apparatus 300. FIG. 6 is a block diagram illustrating an example of the functional configuration of the SoS unit 330. As illustrated in FIG. 6, the SoS unit 330 includes an output control unit 331 and a management unit 332.

The output control unit 331 serves to control output of various kinds of data processed by the service providing apparatus 300. For example, on the basis of the analysis result of the resilience analysis, the output control unit 331 outputs information obtained by visualizing the analysis result. A method for outputting the information may be any method, but for example, a method for displaying the information on a display, a method for transmitting the information to an external apparatus connected over a network, and the like can be applied.

The management unit 332 serves to manage a complex system according to the analysis result of the resilience analysis. For example, the management unit 332 manages the implementation of scenarios of policies, plans and measures determined from the analysis result. As described above, the scenarios of policies, plans and measures are reconstruction and the like of complex system networks. Details of the management process of the management unit 332 will be described below.

Figure 7:
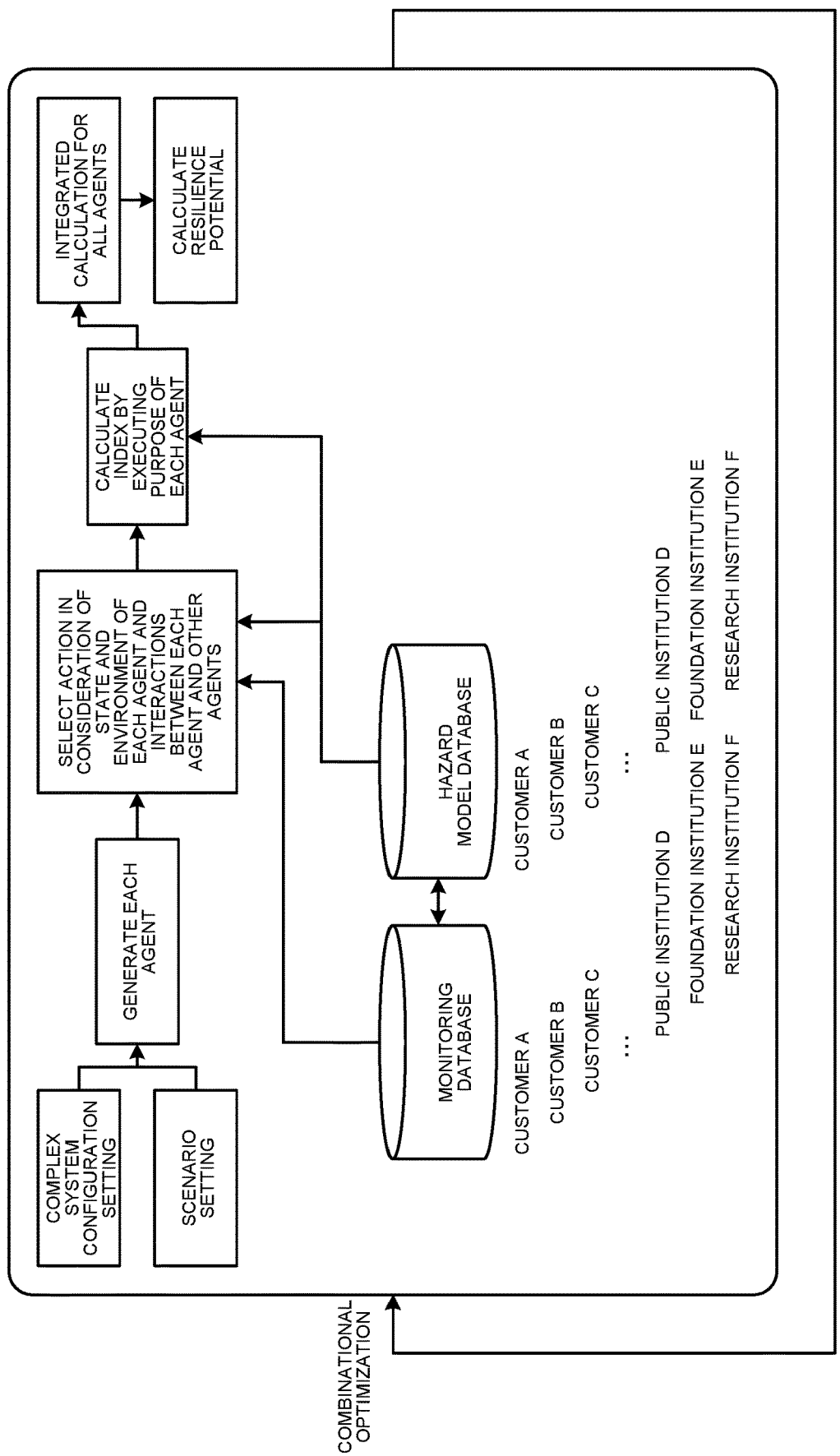
FIG. 7 is a diagram illustrating an example of the overall flow of resilience analysis according to the present embodiment.

The following describes the outline of the resilience analysis according to the present embodiment. FIG. 7 is a diagram illustrating an example of the overall flow of the resilience analysis according to the present embodiment. FIG. 7 illustrates an example of the resilience analysis using an analysis model including a multi-agent model.

The resilience analysis is performed by the following procedure.

S01: The setting unit 121 sets scenarios (hazard scenarios, risk scenarios, and activities scenarios) corresponding to configuration data, actions, and hazard models of a complex system according to a designation from the service providing apparatus 300 (the SoS unit 330) and the like. A hazard model is stored in a hazard model database.

S02: The analysis unit 122 generates agents.

S03: The analysis unit 122 selects an action in consideration of monitoring data such as a state and an environment of each agent and interactions between each agent and other agents. The monitoring data is stored in a monitoring database.

S04: The analysis unit 122 calculates a resilience index by executing the purpose of each agent.

S05: The analysis unit 122 calculates a value by integrating resilience indexes of all agents. The analysis unit 122 may further calculate a resilience potential.

In the present embodiment, the platform 100 is provided as part of a resilience analysis framework. The platform 100 includes a function (the setting unit 121) of setting information required for resilience analysis in accordance with a designation from the service providing apparatus 300 (the SoS unit 330) and the like, and a function (the analysis unit 122) of performing resilience analysis according to setting. With this configuration, resilience analysis of a complex system can be more efficiently performed.

An analysis model may be a surrogate model constructed to substitute (replace) analysis using the multi-agent model as described above. The surrogate model is constructed using, for example, a result of comprehensively preliminarily performing a physical simulation of the multi-agent model for each state, each action, each hazard (hazard model), and a value function. The surrogate model may be a probability statistical model such as a hierarchical Bayesian model, or a model constructed by a machine learning technology such as a neural network model.

Figure 8:
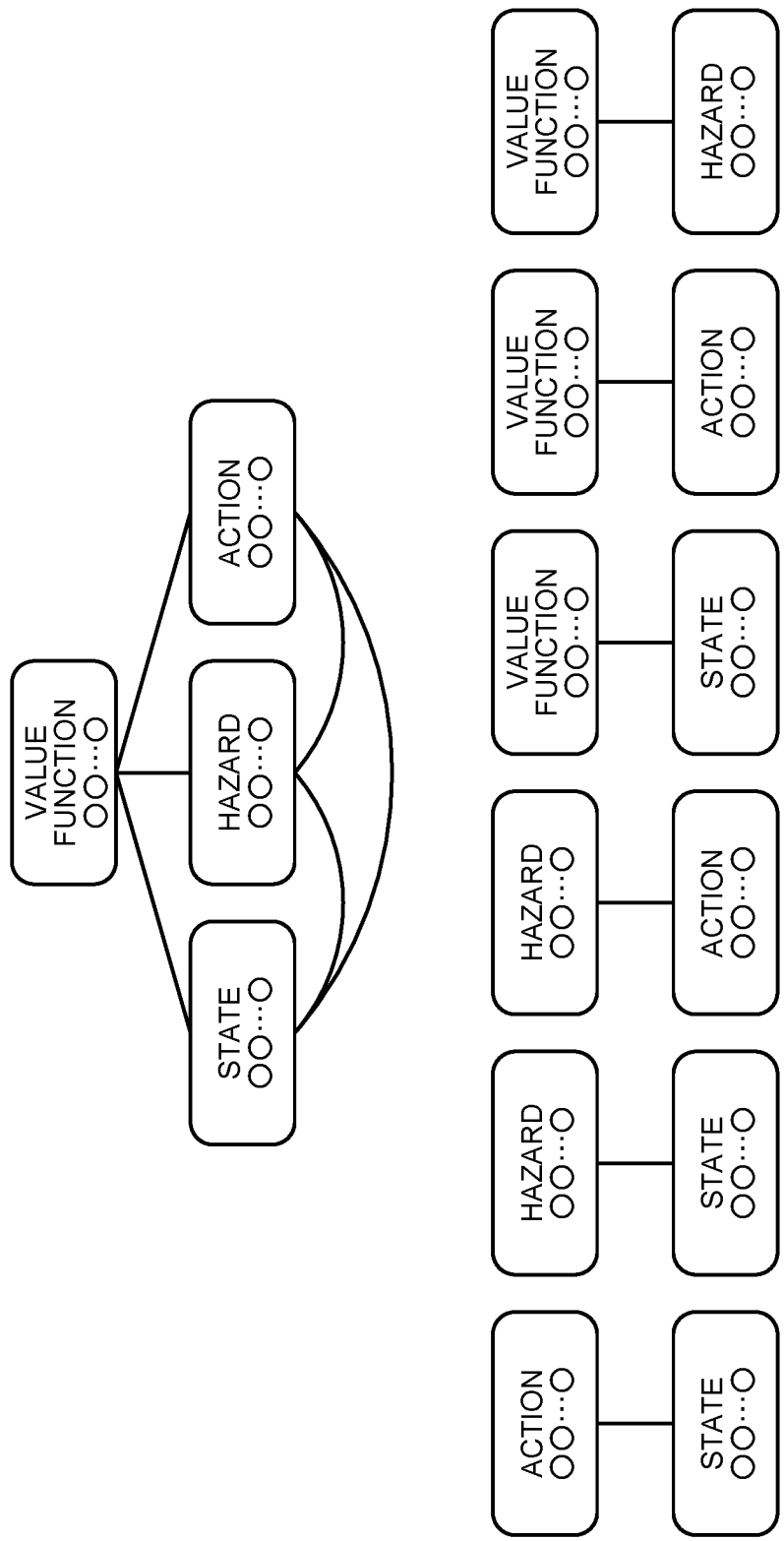
FIG. 8 is a diagram illustrating an example of a surrogate model.

By using learning data preliminarily obtained by the execution of a comprehensive physical simulation, and the like, a surrogate model representing the relationship among items listed below may be constructed. FIG. 8 is a diagram illustrating an example of a surrogate model constructed in this way.

State and action
Hazard and state
Hazard and action
Value function and state
Value function and action
Value function and hazard
Hazard, state, and action
Value function, state, hazard, and action The surrogate model may be constructed for each time point, or may be constructed as a model also including time response (model also considering time dependence) such as Lagrangian neural networks model to be described below.

In this way, the surrogate model can be interpreted as a model representing a causal relationship (correlation) at the target time of the value function, each state, each action, and each hazard. The surrogate model can output hazards and states in continuous or discrete levels for each location or node, can also output the value function, and replace a multi-agent simulation.

Figure 9:
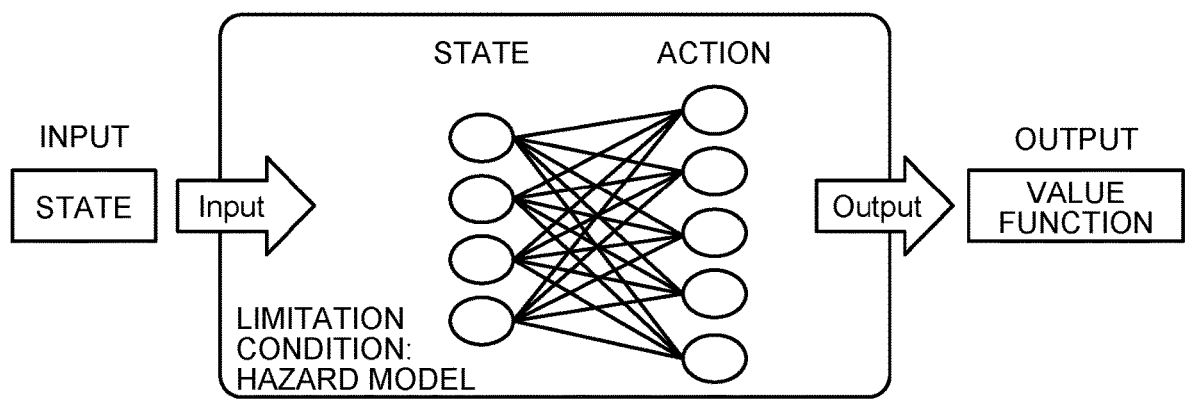
FIG. 9 is a diagram illustrating an example of a simulation using a multi-agent model.

A method for constructing a surrogate model will be further described. FIG. 9 is a diagram illustrating an example in which a simulation using a multi-agent model is replaced with a surrogate model. In such an example, the surrogate model is an example in which a value function is obtained as output from each state being input by using a surrogate model for the value function, each state, and each action when the correspondence relationship between state variables and actions is determined as a fixed limitation condition. Variable hazards may be incorporated in the surrogate model instead of hazards with a fixed condition. Furthermore, the surrogate model may be used only for part of analysis such as output of a failure rate (action) with respect to a load (hazard).

In a simulation using a multi-agent model, the correspondence relationship between states state variables) and actions under a given limitation condition is preliminarily prepared for each component such as nodes and meshes. The limitation condition is, for example, a hazard model. As described above, the hazard model may include an environmental condition. Furthermore, by using a preset probabilistic model (correspondence probability table, probability distribution, Markov state transition model, Bayesian network model, and the like), an action corresponding to an input state is selected from among multiple preset actions with an output value of a value function as an index. By the simulation, states of all components (all nodes, all meshes, and the like) are transitioned over time, and temporal and spatial patterns are generated. In this way, a temporal and spatial simulation is performed.

Moreover, at each time point, a value of a value function can be calculated for components (all nodes, all meshes, and the like constituting a network) of a target system. By preliminarily performing a simulation in which states, actions, and limitation conditions are comprehensively changed, learning data for surrogate modeling can be prepared for all the components (all nodes, all meshes, and the like) of the target system.

In the multi-agent model, states, hazard models, actions, and value functions may be components. In the surrogate model, for example, the hazard model is set as a limitation condition, the state is set as an input variable, and the value function is set as an output variable.

Under a given limitation condition, by inputting a value of a state variable to the surrogate model, a value of a value function can be output from the surrogate model. In a case that hazards are also included in the surrogate model, a hazard model is set and then variables of the hazard model are changed. With this configuration, the surrogate model can be constructed from simulation results related to changes in a response and changes in a failure rate.

The surrogate model enables resilience analysis to be performed at higher speed than an analysis model using the multi-agent model. Therefore, the resilience analysis can be performed multiple times under different analysis conditions, and prioritization or optimization can be performed at high speed. For example, as illustrated in FIG. 7, it is possible to repeatedly perform resilience analysis by changing analysis conditions and implement combinational optimization for obtaining optimal analysis conditions.

The optimization unit 124 obtains an output value of a value function by using, for example, surrogate models each obtained by modeling different scenarios of policies, plans and measure and identifies scenarios of policies, plans and measures for obtaining an optimal output value, or configures a combinational optimization problem so as to prioritize each scenarios of policies, plans and measures based on the output value. The optimization unit 124 can solve the combinational optimization problem by an optimization engine. The optimization engine can be implemented by, for example, a Simulated Bifurcation Machine (SBM) and a quantum computer.

In an optimization problem, when the number of state variables (or level divisions) of a component (for example, a node) is excessively large, one component is divided into a plurality of components (for state variable or each level) and is subjected to parallel processing, thereby replacing processing for one component. For example, when the state quantity of one node is expressed by five levels (1, 2, 3, 4, and 5) of 1 to 5, one node can be divided into five nodes expressed by two levels (0, 1) and subjected to parallel processing.

Figure 10:
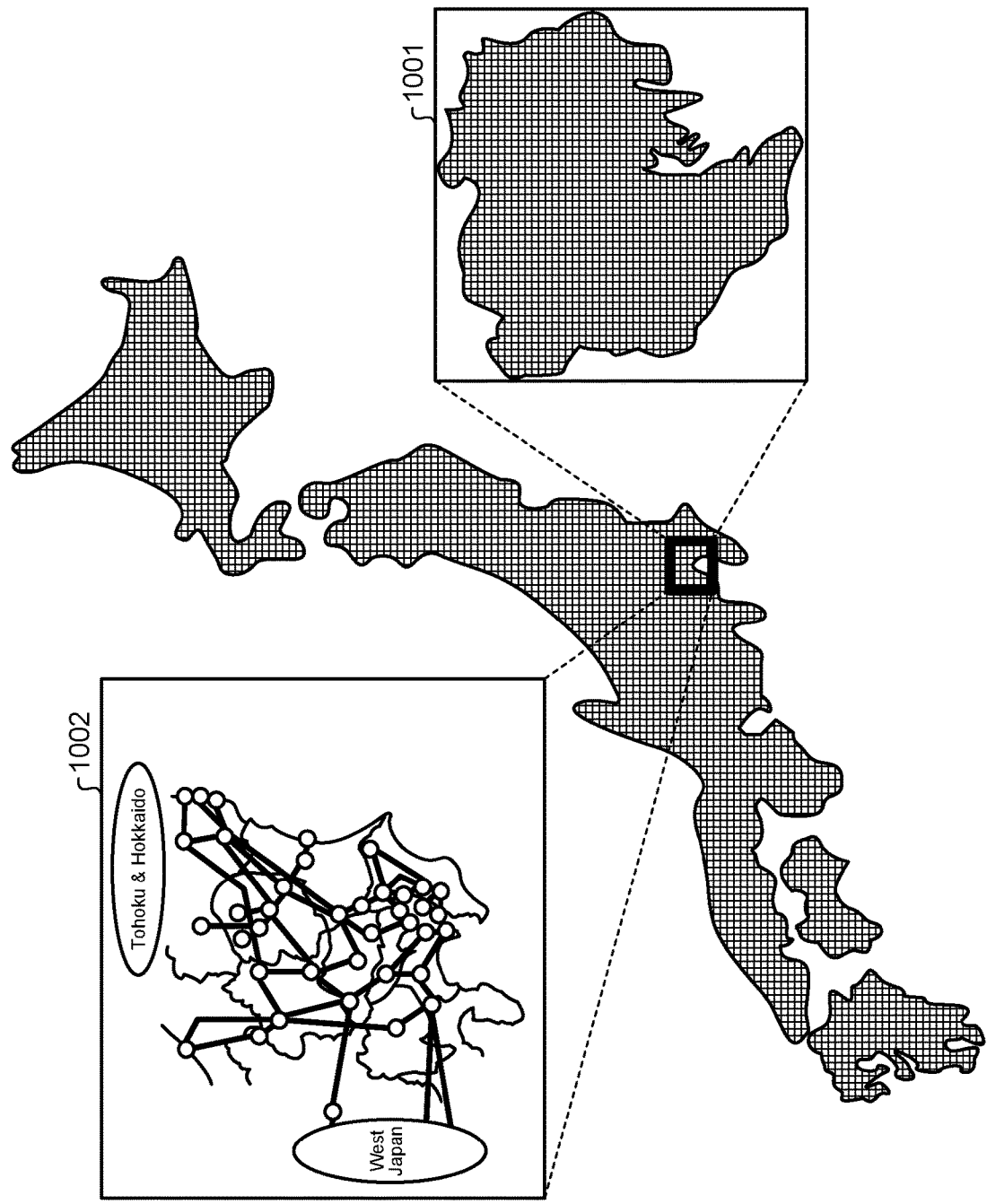
FIG. 10 is a diagram illustrating an example of a component model.

FIG. 10 is a diagram illustrating an example of a component model. FIG. 10 mainly illustrates an example in which multiple meshes obtained by dividing a region to be analyzed are used as a component model. A model 1001 represents components (meshes) of a region where part of an entire region is enlarged. A model 1002 indicates an example of a network model including multiple nodes and transfer lines, which connect the nodes to one another, as a component model.

Figure 11:
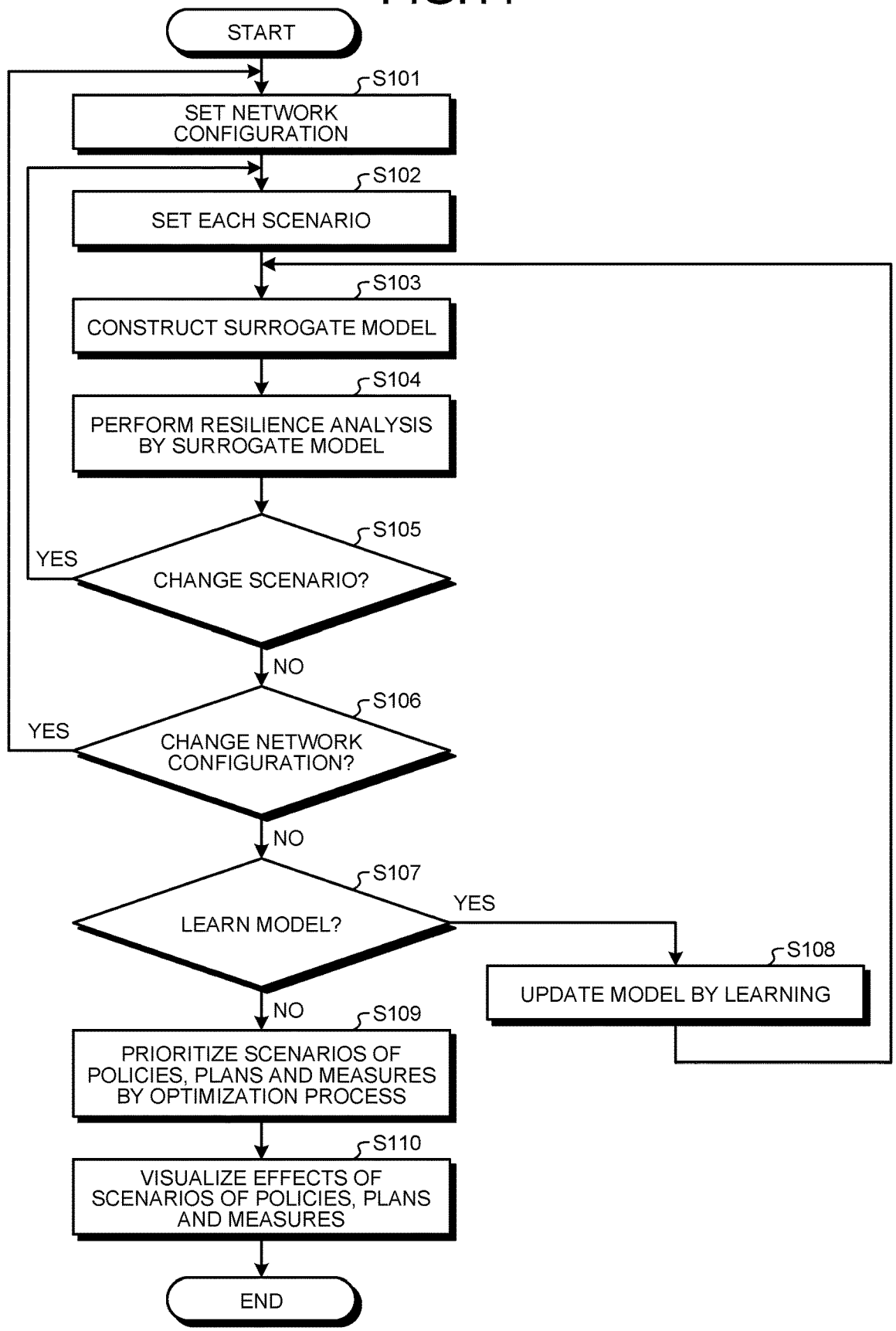
FIG. 11 is a flowchart illustrating an example of a resilience analysis process in the present embodiment.

The following describes the flow of a resilience analysis process performed by the information processing system 41 according to the present embodiment. FIG. 11 is a flowchart illustrating an example of a resilience analysis process in the present embodiment.

The setting unit 121 of the platform 100 sets the network configuration (configuration data) of a target system (step S101). The setting unit 121 sets each scenario (risk scenario, hazard scenario, and activities scenario) corresponding to an action or a hazard model (step S102). The network configuration and the scenario may be set according to a designation from the service providing apparatus 300 (the SoS unit 330 or the service unit 310), for example.

The analysis unit 122 constructs a surrogate model by using the set network configuration and scenario (step S103), The analysis unit 122 performs resilience analysis by the constructed surrogate model (step S104). The analysis unit 122 determines whether to change the scenario (step S105).

For example, when a result of the resilience analysis is output to the service providing apparatus 300 and the like and then the scenario is designated to be changed according to the result, the analysis unit 122 determines to change the scenario. When scenarios of multiple patterns are designated for an optimization process and the like, the analysis unit 122 may determine that the scenario is changed to a scenario of an unprocessed pattern.

In response to determining to change the scenario (Yes at step S105), the procedure returns to step S102. Then, the changed scenario is set and the process is repeated. In response to determining not to change the scenario (No at step S105), the analysis unit 122 determines whether to change the network configuration (step S106).

For example, when the result of the resilience analysis is output to the service providing apparatus 300 and the like and then the network configuration is designated to be changed according to the result, the analysis unit 122 determines to change the network configuration. When network configurations of multiple patterns are designated for an optimization process and the like, the analysis unit 122 may determine that the network configuration is changed to a network configuration of an unprocessed pattern.

In response to determining to change the network configuration (Yes at step S106), the procedure returns to step S101. Then, the changed network configuration is set and the process is repeated, in response to determining not to change the network configuration (No at step S106), the learning unit 123 determines whether to learn the model (step S107).

For example, when it is designated to execute learning, the learning unit 123 determines to execute the learning. In response to determining to execute the learning (Yes at step S107), the learning unit 123 learns the surrogate model (step S108). After the learning, the procedure returns to step S103. Then, the surrogate model is reconstructed with parameters updated by the learning, and the process is repeated. The learning of the surrogate model does not need to be performed during the resilience analysis process, and may be performed independent of the resilience analysis process.

In response to determining not to execute the learning (No at step S107), the optimization unit 124 performs an optimization process and prioritizes scenarios of policies, plans and measures (step S109). When the optimization process is not designated to be performed, the optimization process may not be performed. Information indicating the analysis result is transmitted to the service providing apparatus 300 by, for example, the communication control unit 125.

The output control unit 331 of the service providing apparatus 300 visualizes the analysis result (effects of the scenarios of policies, plans and measures, and the like) by using the transmitted information (step S110).

Figure 12:
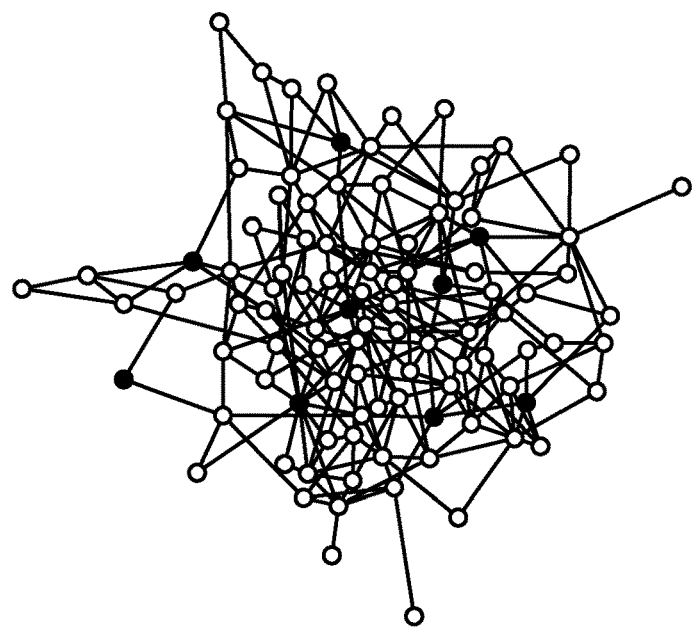
FIG. 12 is a diagram illustrating an example of a screen that visualizes a result of resilience analysis.
Figure 13:
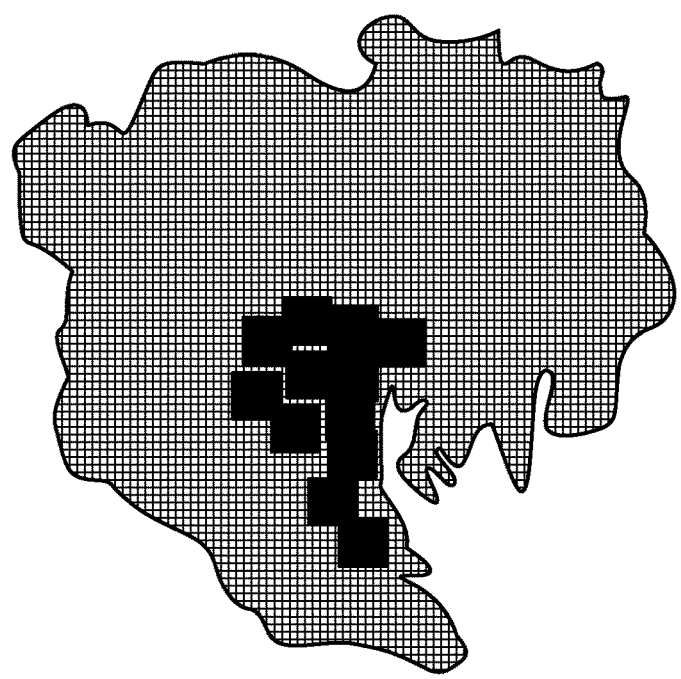
FIG. 13 is a diagram illustrating an example of a screen that visualizes a result of resilience analysis.

FIG. 12 and FIG. 13 are diagrams illustrating examples of a screen that visualizes a result of resilience analysis.

FIG. 12 is an example of visualizing a result of resilience analysis using a network model including nodes as components similar to the model 1002 of FIG. 10. In a case that a target system is, for example, a plant, each node corresponds to any different one of a generator, a bearing, a battery, a pump, a rotary machine, a control apparatus, a power transmission/distribution apparatus, and the like. The output control unit 331 displays a node, which is in a stopped state due to a failure, with an open circle, and displays a node, which is in a recovery (active) state, with a filled circle, for example.

FIG. 13 is an example of visualizing a result of resilience analysis using a model including meshes as components as in the model 1001 of FIG. 10. When a target system is an infrastructure system that is a lifeline, for example, the respective meshes represent the states of lifelines such as power, distribution, traffic (railway and road), communication, water supply, sewerage, and gas, respectively. For example, the output control unit 331 displays a mesh, which is in a stopped state, with a bright color, and displays a mesh, which is in a recovery (active) state, with a dark color.

The method for visualizing the resilience index is not limited to the above, and any method may be used. In addition to the method for displaying a recovery degree or a damage degree by levels according to colors as described above, a method for displaying it by levels according to numerical values may be used. Furthermore, the output control unit 331 may also display changes in the resilience index according to time points. When the optimization process is performed, the output control unit 331 may also display scenarios of policies, plans and measures in descending order of effect (priority order), for example.

An administrator of a target system (for example, a system administrator of the service providing apparatus 300) can repeatedly perform resilience analysis under different analysis conditions or implement scenarios of policies, plans and measures for the target system by referring to the visualized analysis result.

For example, the administrator can visualize or prioritize effects of scenarios of policies, plans and measures by repeating the resilience analysis method while changing the setting of a network configuration. When the optimization engine is configured to execute a combinational optimization problem, it is also possible to extract optimal resilience improvement scenarios of policies, plans and measures at a designated time point (may be future estimation).

The administrator can manage the implementation of scenarios of policies, plans and measures by using, for example, the SoS unit 330. For example, the SoS unit 330 improvement scenarios of policies, plans and measures designated by the administrator to be implemented according to the visualized analysis result. The SoS unit 330 may implement scenarios of policies, plans and measures regardless of a designation of the administrator and the like. For example, the SoS unit 330 may also implement scenarios of policies, plans and measures determined by the optimization process to have the highest priority.

In a complex system network, by using the surrogate model in the present embodiment, all nodes can be controlled only by controlling part of the nodes. By appropriately controlling actions (scenarios of policies, plans and measures) at each node (selection and the like of a combination of the actions), the entire complex system network can be made robust against disturbances or can be flexibly reconstructed in some cases.

FIG. 14 is a diagram illustrating an example of a change in the state of a target system due to reconstruction. FIG. 14 illustrates an example in which the entire target system is changed to a safety state (recovery state) by scenarios of policies, plans and measures such as controlling nodes in a recovery state or coupling new nodes.

Figure 15:
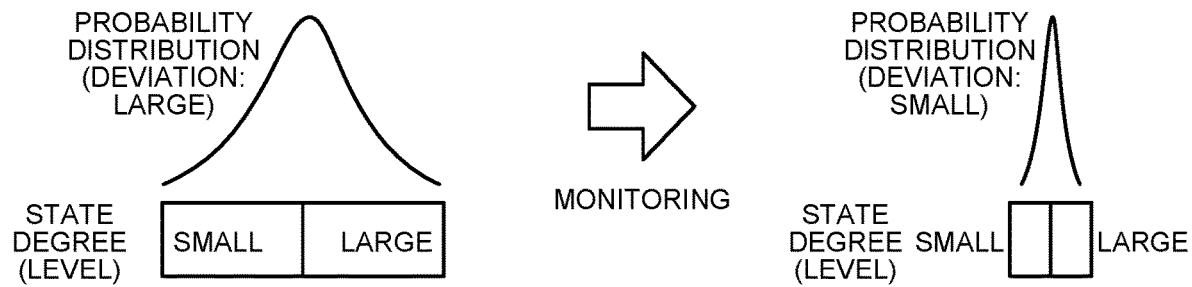
FIG. 15 is a diagram for explaining an example of advantages of monitoring.

The following describes advantages obtained by monitoring states. FIG. 15 is a diagram for explaining an example of advantages of monitoring. As illustrated in FIG. 15, monitoring the states (state variables of components, hazard-related variables, and the like) decreases the deviation of a probability distribution of states and increases the degree of certainty of estimation (may be estimation for a value function, a risk, and a hazard) of a resilience index.

In the present embodiment, resilience analysis can be performed by virtually changing the probability distribution of states. With this, monitoring items that are highly sensitive to a resilience index can be clarified.

For example, the analysis unit 122 can obtain a type of monitoring data an influence of which on an output value is greater than those of the other types. The analysis unit 122 may perform resilience analysis by changing setting information including at least part of a position, where an acquiring device (sensor and the like) of the monitoring data is arranged, and an operation condition of the acquiring device, thereby obtaining optimal setting information. The communication control unit 125 may transmit information indicating the obtained type or setting information to the service providing apparatus 300.

There is a case that common hazards or common monitoring data are present in multiple infrastructure systems. In this case, when the framework of the present embodiment is used, information such as hazard models corresponding to the common hazards or resilience analysis results using the common monitoring data can be shared by multiple system administrators (operators).

For example, it is assumed that the information processing system 41 includes the service providing apparatuses 300 corresponding to different target systems. The following describes, as an example, a case where two service providing apparatuses 300 as service providing apparatuses 300a and 300b, in which at least one of hazards or monitoring data is common, are provided.

The analysis unit 122 performs resilience analysis on a target system corresponding to, for example, the service providing apparatus 300a. The communication control unit 125 can be configured to transmit a result of the resilience analysis to the service providing apparatus 300b as well as the service providing apparatus 300a.

The following describes a specific example of resilience analysis according to the present embodiment.

Examples of target systems include elevator systems, power supply/power electronics systems, air conditioning systems, heat transport systems, and the like, which are installed in infrastructure facilities (buildings, data centers, plants, factories, steel towers, and the like). In these target systems, for example, elevators, power supplies, batteries, air conditioning, pumps, and the like may be components.

In the target systems as described above, due to a combination of the following hazard factors, even though each component behaves within a normal range, emergent phenomena may occur due to nonlinear interactions between composite hazards, resulting in harm and accidents.

Irregular dynamic load due to wind action and earthquake

Thermal deformation due to solar radiation

Installation error in building

Structural deterioration of building

Dynamic load (impact and vibration) due to human flow or movement

Change in temperature of structure due to failure in air conditioning system

It is difficult to preliminarily verify all combinations by, for example, a reliability test due to time and economic constraints. Therefore, for example, when a surrogate model as in the present embodiment is used, it is possible to perform resilience analysis at higher speed. Furthermore, when combinational optimization using an optimization engine is configured to be executed, it is possible to prioritize and optimize activities at higher speed.

On the other hand, for example, monitoring of each component, monitoring by a camera in a building, and monitoring of building deterioration may often be performed independently by different monitoring systems. According to the present embodiment, it is possible to implement scenarios of policies, plans and measures that an acquiring device of monitoring data used in a monitoring system is used in another monitoring system as an avatar terminal.

For example, a surveillance camera that acquires an image in an elevator, a drone with a camera installed at an upper part of the elevator, and an autonomous mobile monitoring robot are avatar terminals, and can be configured to monitor a harmed state of a building structure member in the vicinity of the elevator on each floor.

As another example, in the case of a component whose failure probability changes depending on the temperature, temperature monitoring data associated with a cooling system can be used for detecting failure signs of another component. In addition, airflow inside and outside a building may affect elevator or air conditioning hazards. Therefore, data obtained by monitoring air flow or pressure for air conditioning may be useful for resilience analysis of an elevator.

As described above, according to the framework of the present embodiment, among different target systems, monitoring data associated with components can be shared, and information on changes and the like in variables related to hazard models obtained from the monitoring data can be shared.

As a specific example of another resilience analysis, for example, there is resilience analysis including risk analysis and restoration process analysis for important infrastructures (transportation networks, power grids, water and sewerage networks, and the like) due to irregular dynamic loads caused by virtual earthquakes, typhoons, strong winds, and the like.

In such resilience analysis, for example, a model obtained by dividing a target region into discrete meshes or a network model composed of multiple nodes of a target infrastructure is used. A resilience index is calculated by, for example, a hazard model that receives the following input values for each mesh or each node (branch point) and outputs output values such as a failure rate, a damage degree, a restoration rate, a repair rate, and the like of each infrastructure.

Magnitude of earthquake

Load variable such as ground amplification factor

Structure variable and strength variable of damage degree calculation target

Environment/boundary condition

The hazard model may be changed according to actions in a complex system network (introduction of a distributed infrastructure, reconstruction method of a distributed infrastructure network, enhancement of monitoring, and the like). For example, the hazard model may be constructed for each action (activities scenario), or may be constructed to include variables related to actions (activities) in the hazard model.

Modification Example 1

As described above, a surrogate model may be a model including a time response. The present modification example describes, as an example of such a model, an example of constructing a surrogate model as a Lagrangian neural network.

The Lagrangian neural network corresponds to a discretization numerical calculation method for partial differential equations and a machine learning method. Examples of the discretization numerical calculation method include a finite element method, a finite volume method, and a difference method. Hereinafter, a model that introduces the Lagrangian neural network into multi-agent analysis is referred to as multi-agent-system-based Lagrangian neural network (MASLN).

MASLN can be constructed as follows.

S1: Definition of MASLN

A state variable, which is temporally and spatially discretized, and a state change rate, which represents a change rate of the state variable, are defined as input data (input value) of a model. In this case, conditional data may be added as the input data. A value functional of each element in a target system is defined as output data (output value) of the model. In this case, a state variable and a state change rate at a next time step (a next time point) may be added as output. A value functional $\varphi_\theta$ can be expressed by the sum ($\varphi_\theta=\Sigma\varphi_e$) of each value functional $\varphi_e$ of components (meshes, nodes, and the like) of a multi-agent model. A value functional of each component can be expressed by, for example, the sum (or linear algebraic combination) of value functions such as an availability index (value function 1), an economic index (value function 2), and a risk index (value function 3).

A model (conversion model) that converts input data into output data or a model (estimation model) that estimates output data from input data is defined. In the case of a neural network, examples of parameters defining a model include the number of layers, the number of components in each layer, a structure of an activating function in each component, and the like. In the case of a hierarchical Bayesian model, examples of parameters defining a model include a latent variable of an intermediate layer, data distribution, preliminary distribution, a structure of a hyper-parameter, and the like.

S2: Preparation of Learning Data of MASLN

As described above, a physical simulation of a multi-agent model is performed for each component and each time step, and a result of the physical simulation is prepared as correct answer data for calculating a loss function in MASLN. Learning data including input data used in the physical simulation and the correct answer data is used in learning processing.

S3: Learning of MASLN

A value functional approximation model (parameter θ) is created by MASLN,

A scalar value $\varphi_\theta$ of a value functional, and a state variable and a state change rate at a next time step are output to input data included in learning data by MASLN. The sign $\varphi_\theta$ represents a value of a value functional output by MASLN defined by the parameter θ.

Gradients represented by the following Expressions (1) and (2) are calculated by using MASLN.

$$\frac{\partial \phi_\theta}{\partial s} \tag{1}$$

$$\frac{\partial \phi_\theta}{\partial \dot{s}} \tag{2}$$

A temporal differentiation of a state variable and a state change rate at a next time step is calculated using MASLN.

Parameters of MASLN are learned so as to minimize a loss function using a value functional, a gradient of a state variable, and a gradient of a state change rate.

Figure 16:
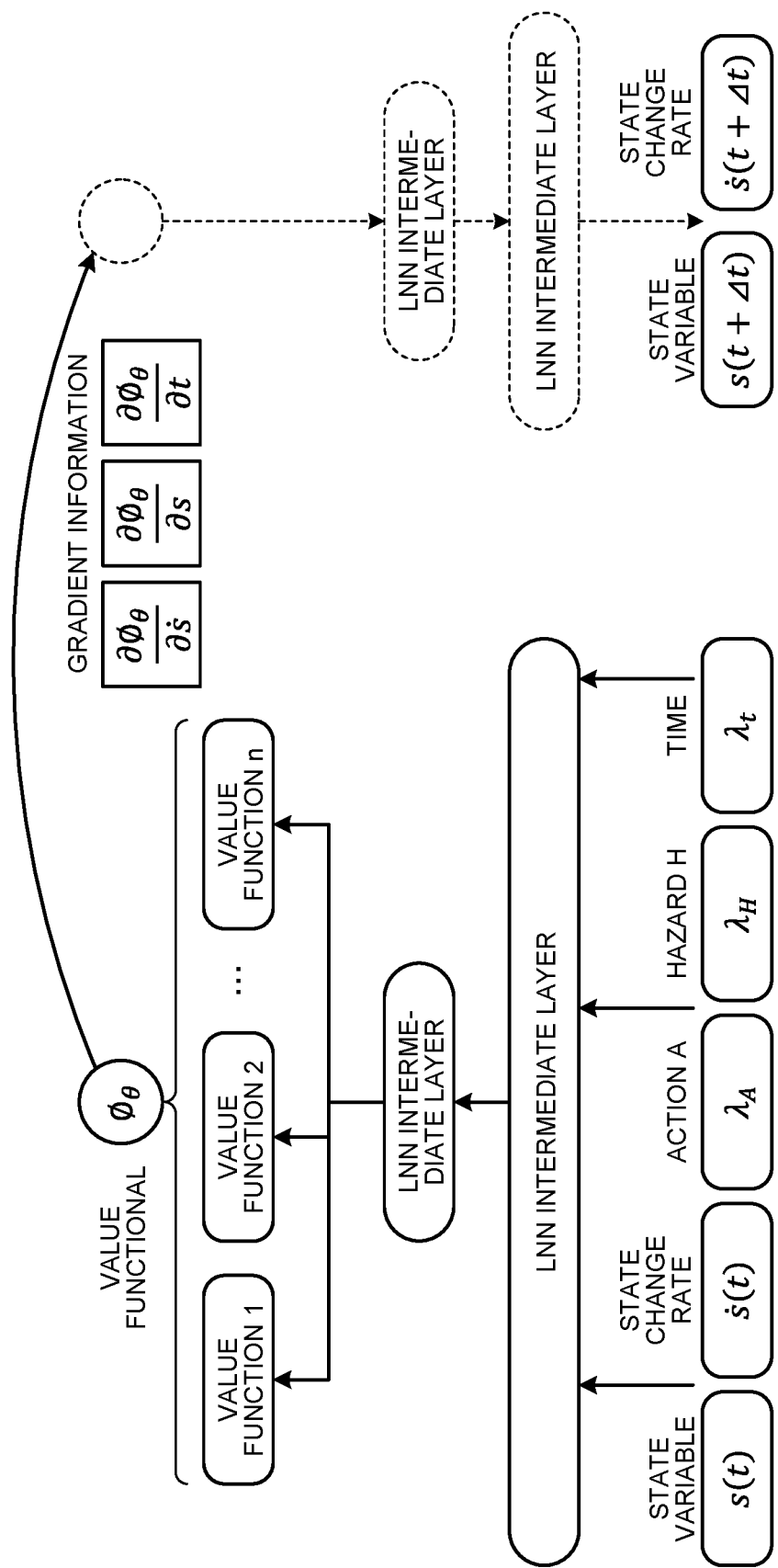
FIG. 16 is a diagram illustrating a structure example of a surrogate model.

The following describes a structure example of MASLN. FIG. 16 is a diagram illustrating a structure example of MASLN. The structure example is an example of a structure where only the value functional is included in the output data.

In the case that output data includes only a value functional, a state variable and a state change rate at a next time step t+Δt are calculated by backpropagation of MASLN. The state variable and the state change rate at the next time step may be estimated by the variation principle from the value functional in the output of MASLN. The MASLN may be configured such that both the value functional and the state variable and the state change rate at the next time step are included in the output data.

The sign $\lambda_A$ indicates conditional data with respect to an action. The sign $\lambda_H$ indicates conditional data with respect to a hazard model. The sign $\lambda_t$ represents conditional data about time. Part of these conditional data may be input.

As illustrated in FIG. 16, MASLN includes an input layer, two intermediate layers, and an output layer. The number of intermediate layers is not limited two, and may be one or three or more.

To the input layer, a state variable and a state change rate for each element and conditional data $\lambda$ are input as input data. The output layer outputs a value functional for each element as output data.

The following describes a loss function used for learning MASLN. The loss function is defined, for example, as below.

A function capable of minimizing a difference between a gradient calculated from MASLN and a gradient of correct answer data that is a preliminary analysis result (calculated for each discretized element)

Gradients include a partial differential about a state variable of a scalar value $\varphi_\theta$ of a value functional, a partial differential about a state change rate of the scalar value $\varphi_\theta$ of the value functional, a partial differential about a time of the state change rate, and a partial differential about a time of the state variable. For each of these gradients, a difference between a value of a gradient (gradient value) calculated from MASLN and a gradient value of correct answer data is calculated.

A loss function corresponds to, for example, the total sum of the square sum of a difference between gradient values of each element in an analysis region. A gradient value of correct answer data corresponds to, for example, aggregated data of a gradient value calculated for each discretized element. A gradient value of the correct answer data may be calculated using the following relational model.

Relational models such as an approximation model related to a value functional in which a state variable is defined as a variable Relational models such as an approximation model related to a state variable in which a time is defined as a variable The loss function may include a function capable of minimizing a difference between a value functional value calculated from MASLN and a value functional value acquired from a preliminary analysis result about a value functional.

For a structure where output data of MASLN includes a physical quantity such as displacement and displacement velocity, a function capable of minimizing a difference between a value calculated from MASLN and a value acquired from a preliminary analysis result about a physical quantity such as displacement and displacement velocity may be added as a loss function. A weight coefficient of each term in the sum of each of these loss functions may be changed.

A chain rule of a partial differential related to conditional data $\lambda$ represented by the following Expressions (3) and (4) may be applied to a gradient related to the number of states or a state change rate of a value functional in a loss function.

$$\frac{\partial \varphi_\theta}{\partial \lambda} \frac{\partial \lambda}{\partial s} \tag{3}$$

$$\frac{\partial \varphi_\theta}{\partial \lambda} \frac{\partial \lambda}{\partial \dot{s}} \tag{4}$$

Partial differential data related to conditional data $\lambda$ of a value functional and partial differential data related to a state variable or a state change rate of the conditional data $\lambda$ are preliminarily prepared as learning data (correct answer data). In learning of MASLN, partial differential data related to conditional data $\lambda$ of a value functional (the following Expression 5), partial differential data related to a state variable of the conditional data $\lambda$ (the following Expression 6), and partial differential data related to a state change rate of the conditional data $\lambda$ (the following Expression 7) are also calculated.

$$\frac{\partial \varphi_\theta}{\partial \lambda} \tag{5}$$

$$\frac{\partial \lambda}{\partial s} \tag{6}$$

$$\frac{\partial \lambda}{\partial \dot{s}} \tag{7}$$

A loss function may include, about partial differential data related to conditional data $\lambda$ of a value functional and partial differential data related to a state variable a state change rate of the conditional data $\lambda$, a gradient estimated from MASLN and a loss function related to the consistency of preliminary learning data.

In the present modification example, the learning unit 123 performs learning processing of MASLN. The learning unit 123 learns an analysis model so as to minimize a difference between a gradient of output data and a gradient of correct answer data.

As described above, in the present modification example, a value functional is integrated into an output layer of a neural network with the idea based on the variation principle of utilizing Lagrangian of a value functional formed of each element of discretization. MASLN is learned to make gradients of a state variable and a state change rate of Lagrangian consistent with a temporal change in the state variable and the state change rate (such as the consistency with a result set of a numerical experiment on which a physical simulation is preliminarily performed). With MASLN constructed in this manner, an ultrafast simulation technique utilized even for a time-dependent physical phenomenon can be implemented.

It is assumed that a state variable of an abnormality sign in a component can be monitored from the edge terminal 200. In this case, in the present modification example, a value functional can be used as an index to select an action so that an entire target system can be maintained in a safe state (recovery state or normal state). With this configuration, it is possible to manage the target system so as to increase its availability.

As described above, according to the present embodiment, it is possible to efficiently analyze resilience and the like of a complex system.

Figure 17:
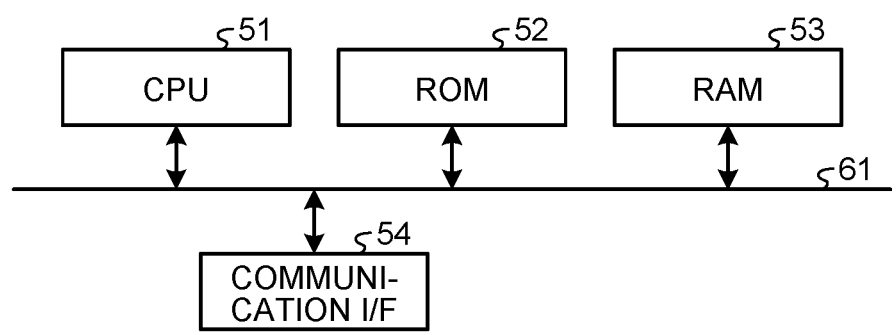
FIG. 17 is a hardware configuration diagram of an information processing apparatus according to the present embodiment.

The following describes the hardware configuration of the information processing apparatus according to the present embodiment with reference to FIG. 17. FIG. 17 is an explanatory diagram illustrating an example of the hardware configuration of the information processing apparatus according to the present embodiment.

The information processing apparatus according to the present embodiment includes a control device such as a CPU 51 and, memory devices such as a read only memory (ROM) 52 and a RAM 53, a communication interface (I/F) 54 connected to a network to perform communication, and a bus 61 for connecting units to each other.

A computer program executed by the information processing apparatus according to the present embodiment is preliminarily incorporated in the ROM 52 and the like so as to be provided.

The computer program executed by the information processing apparatus according to the present embodiment may be a file in an installable format or in an executable format, and be recorded in a non-transitory computer-readable recording medium, such as a compact disc read only memory (CD-ROM), a flexible disk (FD), a compact disc recordable (CD-R), or a digital versatile disc (DVD), so as to be provided as a computer program product.

Furthermore, the computer program executed by the information processing apparatus according to the present embodiment may be stored in a computer connected to a network such as the Internet and be downloaded over the network so as to be provided. The computer program executed by the information processing apparatus according to the present embodiment may be provided or distributed over a network such as the Internet.

The computer program executed by the information processing apparatus according to the present embodiment enables a computer to function as each unit of the inibrmation processing apparatus described above. After the CPU 51 reads the computer program on a main storage apparatus from a computer-readable storage medium, this computer can execute the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
a plurality of edge terminals;
an information processing apparatus; and
one or more service providing apparatuses, wherein
each of the edge terminals include one or more first hardware processors configured to transmit, to the information processing apparatus, monitoring data indicating a state of a target system to be analyzed,
the information processing apparatus includes one or more second hardware processors configured to
perform an analysis process by using an analysis model that inputs an input value including the monitoring data transmitted from the edge terminals and outputs an output value of a value function, the analysis process being a process to obtain the output value in response to the input value, and
transmit, to the service providing apparatuses, information indicating an analysis result of the analysis process, and
each of the service providing apparatuses include one or more third hardware processors configured to output information obtained by visualizing the analysis result the basis of information indicating the analysis result and to implement scenarios of policies, plans, and/or measures for the target system based on the visualized analysis result,
wherein
the analysis model is a model in which at least one of: configuration data indicating a configuration of the target system, an action affecting the target system, and a hazard model obtained by modeling a failure occurring in the target system is set as an analysis condition and which represents a relationship between at least two items of the state, the action, the hazard model, and the value function, and
the information processing system further comprises an optimization unit that causes a plurality of the analysis processes to be executed by respectively using a plurality of the analysis models having different analysis conditions from each other and executes an optimization process of obtaining the analysis condition under which the output value is optimal or obtaining a priority order of a plurality of the analysis conditions based on the output value.

2. The information processing system according to claim 1, wherein the analysis model includes a model constructed by machine learning to perform at least part of the analysis process.

3. The information processing system according to claim 1, wherein the second hardware processors is configured to obtain an optimal analysis condition by performing analysis processes whose analysis conditions are different from each other, each of the analysis conditions including at least part of: configuration data indicating a configuration of the target system, an action affecting the target system, and a hazard model obtained by modeling faults occurring in the target system.

4. The information processing system according to claim 1, wherein the second hardware processors
perform the analysis process whose analysis condition includes configuration data indicating a configuration of the target system, and
perform again the analysis process whose analysis condition includes the configuration data having been changed.

5. The information processing system according to claim 1, wherein the second hardware processors
perform the analysis process whose analysis condition includes an action affecting the target system, and
perform again the analysis process whose analysis condition includes the action having been changed.

6. The information processing system according to claim 1, wherein the second hardware processors
perform the analysis process whose analysis condition includes a hazard model obtained by modeling faults occurring in the target system, and
perform again the analysis process whose analysis condition includes the hazard model having been changed.

7. The information processing system according to claim 1, wherein
the one or more service providing apparatuses are service providing apparatuses each corresponding to a different one of target systems, and
the second hardware processors transmit information indicating a result of the analysis process for one of the target systems to the service providing apparatus corresponding to another one of the target systems.

8. The information processing system according to claim 1, wherein the first hardware processors transmit multiple types of the monitoring data to the information processing apparatus, and the second hardware processors obtain a type of the monitoring data having a greater influence on the output value than the other types, and transmit information indicating the obtained type to the service providing apparatus.

9. The information processing system according to claim 1, wherein the second hardware processors obtain optimal setting information by performing the analysis process using the input value including the monitoring data obtained by changing setting information including at least part of: a position where an acquisition apparatus acquiring the monitoring data is arranged, and an operation condition of the acquisition apparatus.

10. The information processing system according to claim 1, wherein the second hardware processors is configured to learn a hazard model by using the monitoring data and output of the hazard model, the hazard model being obtained by modeling faults occurring in the target system.

11. An information processing method performed by an information processing system including a plurality of edge terminals, an information processing apparatus, and one or more service providing apparatuses, the information processing method comprising:

transmitting, by the edge terminals to the information processing apparatus, monitoring data indicating a state of a target system to be analyzed;

performing, by the information processing apparatus, an analysis process by using an analysis model that inputs an input value including the monitoring data transmitted from the edge terminals and outputs an output value of a value function, the analysis process being a process to obtain the output value in response to the input value;

transmitting, by the information processing apparatus to the service providing apparatuses, information indicating an analysis result of the analysis process; and outputting, by the service providing apparatuses, information obtained by visualizing the analysis result on the basis of information indicating the analysis result, and implementing scenarios of policies, plans, and/or measures for the target system based on the visualized analysis result, wherein the analysis model is a model in which at least one of: configuration data indicating a configuration of the target system, an action affecting the target system, and a hazard model obtained by modeling a failure occurring in the target system is set as an analysis condition and which represents a relationship between at least two items of the state, the action, the hazard model, and the value function, and the information processing method further comprises executing a plurality of the analysis processes by respectively using a plurality of the analysis models having different analysis conditions from each other and executing an optimization process of obtaining the analysis condition under which the output value is optimal or obtaining a priority order of a plurality of the analysis conditions based on the output value.

* * * * *